(12) United States Patent
Renfro

(10) Patent No.: US 6,896,387 B2
(45) Date of Patent: May 24, 2005

(54) COURTESY ILLUMINATION DISK FOR A CUP HOLDER

(76) Inventor: Gregg A. Renfro, 320 Maple St., Soddy Daisy, TN (US) 37379

( * ) Notice: Subject to any disclaimer, the term of this patent is extended or adjusted under 35 U.S.C. 154(b) by 0 days.

(21) Appl. No.: 10/427,986

(22) Filed: May 2, 2003

(65) Prior Publication Data

US 2004/0218377 A1 Nov. 4, 2004

(51) Int. Cl.[7] .............................................. F21V 7/04
(52) U.S. Cl. ...................... 362/31; 362/555; 362/488; 362/511; 362/255; 362/311; 362/330; 362/101; 362/562
(58) Field of Search ....................... 362/31, 555, 488, 362/511, 255, 311, 330, 800, 154, 101, 562

(56) References Cited

U.S. PATENT DOCUMENTS

| | | | | |
|---|---|---|---|---|
| 4,115,701 A | * | 9/1978 | Guichard | 250/552 |
| 4,886,183 A | * | 12/1989 | Fleming | 220/739 |
| 5,915,832 A | * | 6/1999 | Baird, Sr. | 362/551 |
| 6,092,905 A | * | 7/2000 | Koehn | 362/101 |
| 6,193,399 B1 | * | 2/2001 | Hulse | 362/511 |
| 6,234,439 B1 | * | 5/2001 | Townsend et al. | 248/311.2 |
| 6,354,711 B1 | * | 3/2002 | McCoy | 362/101 |
| 6,486,797 B1 | * | 11/2002 | Laidman | 340/908.1 |
| 2004/0090771 A1 | * | 5/2004 | Rowland et al. | 362/125 |

* cited by examiner

*Primary Examiner*—Sandra O'Shea
*Assistant Examiner*—Sharon Payne
(74) *Attorney, Agent, or Firm*—Richard C. Litman

(57) ABSTRACT

A device for providing a source of illumination for recessed cup holders on the console of an automotive vehicle, boat and the like. The illumination device includes a clear acrylic disk that is adapted to be nested on the bottom wall of a conventional, standard size cup holder. The acrylic disk has a hollow portion that receives an LED lamp. The lamp is conventionally wired to the vehicle electric system. The device provides a subtle, aesthetic illumination ring of around a receptacle placed in the recessed holder, thus allowing both driver and passenger to safely locate the beverage receptacle at night.

3 Claims, 2 Drawing Sheets

COURTESY ILLUMINATION DISK FOR A CUP HOLDER

BACKGROUND OF THE INVENTION

1. Field of the Invention

The present invention generally relates to receptacles. More specifically, the present invention is drawn to a device for illuminating a recessed cup holder adapted to be utilized in automotive vehicles, boats and the like.

2. Description of the Related Art

The utilization of recessed holders for beverage containers is well known in the prior art. Attempts have been made to provide illumination of the area around and adjacent the recessed area so that a driver and passenger can easily locate their beverage containers during nighttime.

One example of a prior art device that provides illumination for a cup holder is shown in U.S. Pat. No. 6,092,905 (Koehn). The instant device relies on a series of light sources spaced around the top face of an annular lip. The light sources, however, are exposed and are thus subject to damage.

U.S. Pat. No. 5,915,832 (Baird, Sr.) discloses a relatively complicated light/mirror/L.E.D./fiber optic unit for generating light around the top portion of a recessed cup holder.

U.S. Pat. No. 6,193,399 B1 (Hulse) and U.S. Pat. No. 6,234,439 (Townsend et al.) relate to complex wave guide systems for distributing light to a cup holder.

U.S. Pat. No. 4,886,183 (Fleming) is drawn to a holder for canned or bottled beverages, which holder provides a message display on its outer surface. The instant holder is battery operated and would not be readily adapted to be received in a cup holder of an automotive vehicle or a boat.

None of the above inventions and patents, taken either singly or in combination, is seen to disclose an uncomplicated, easy-to-install illumination disk as will subsequently be described and claimed in the instant invention.

SUMMARY OF THE INVENTION

The present invention is a device for providing a source of subdued illumination for recessed cup holders, which holders are located in the console of an automotive vehicle, boat and the like. The illumination device comprises a clear acrylic disk that is adapted to be nested on the bottom wall of a conventional, standard size, recessed cup holder. The acrylic disk has a hollow portion that receives an LED lamp. The lamp is conventionally wired to the vehicle electric system. The device provides a subtle, aesthetic illumination ring around a receptacle placed in the recessed holder, thus allowing both driver and passenger to safely locate the beverage receptacle.

Accordingly, it is a principal object of the invention to provide a device for illuminating a recessed cup holder.

It is another object of the invention to provide a device for illuminating a recessed cup holder, which device is positioned at the bottom of the cup holder.

It is a further object of the invention to provide a device for illuminating a recessed cup holder, which device is rugged and durable.

Still another object of the invention is to provide a device for illuminating a recessed cup holder, which device may easily be installed in an automotive vehicle or boat.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
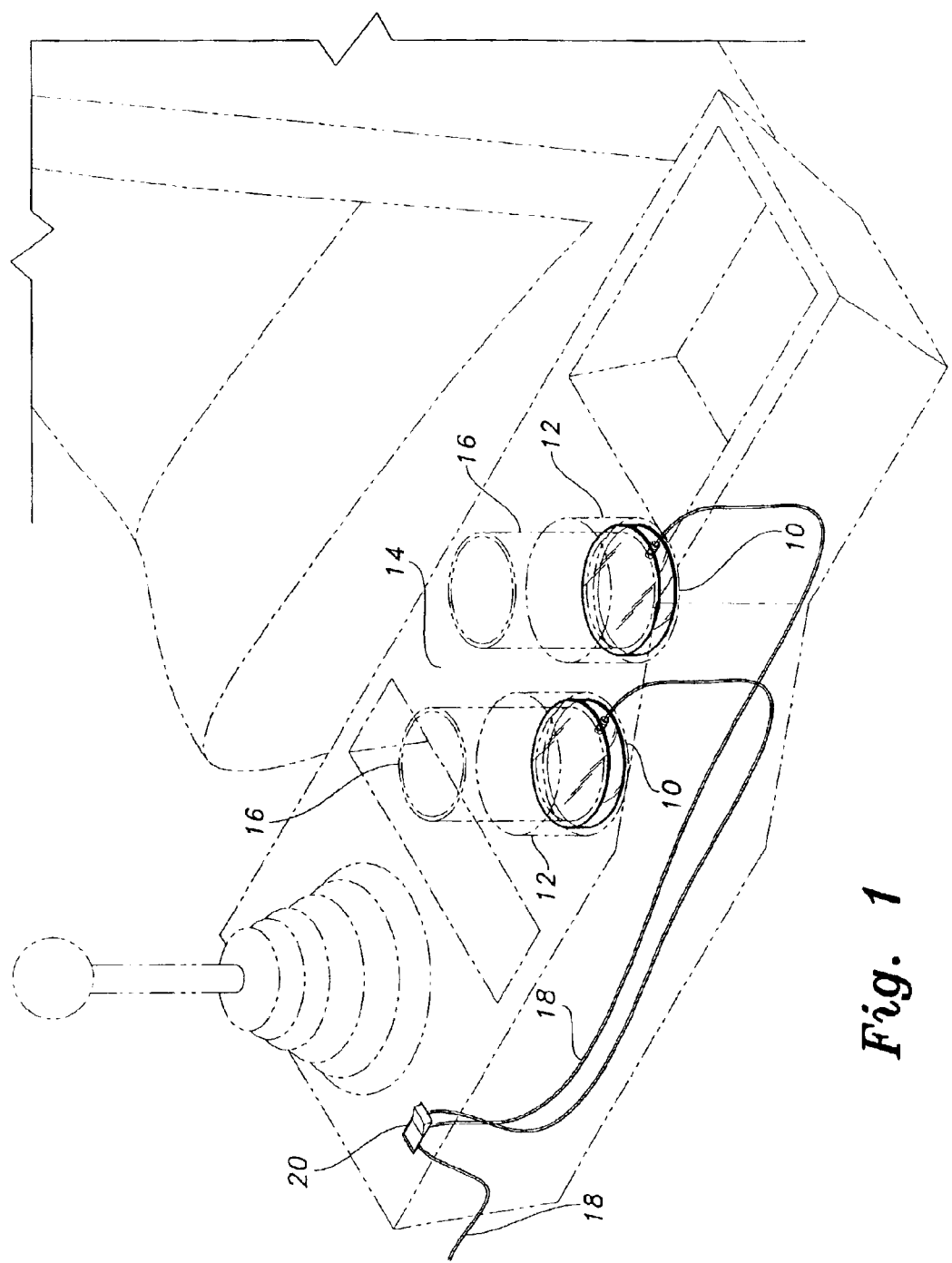
FIG. 1 is an environmental, perspective view of a recessed illuminated cup holder according to the present invention.

Attention is first directed to FIG. 1 of the drawings wherein illuminated disks 10 of the present invention are shown positioned on the bottom surface of recessed cup holders 12 (shown in dotted lines). As illustrated, cup holders 12 are located in the console area 14 of an automotive vehicle or boat and are adapted to receive beverage containers 16 as is common in the art. The cup holders can be conveniently accessed by a driver and passenger (neither of which are shown) seated in the vehicle or boat. Disks 10 are conventionally wired at 18 to the electrical system of the vehicle or boat. A switch 20 is employed to operate the disks as will be explained below.

Figure 2:
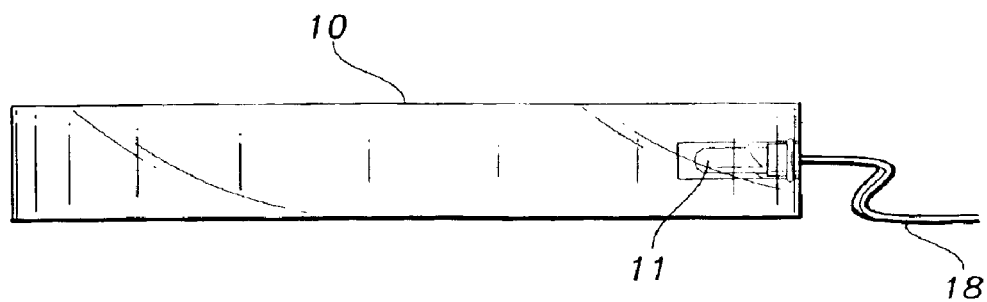
FIG. 2 is a front view of an illumination disk according to the present invention.
Figure 3:
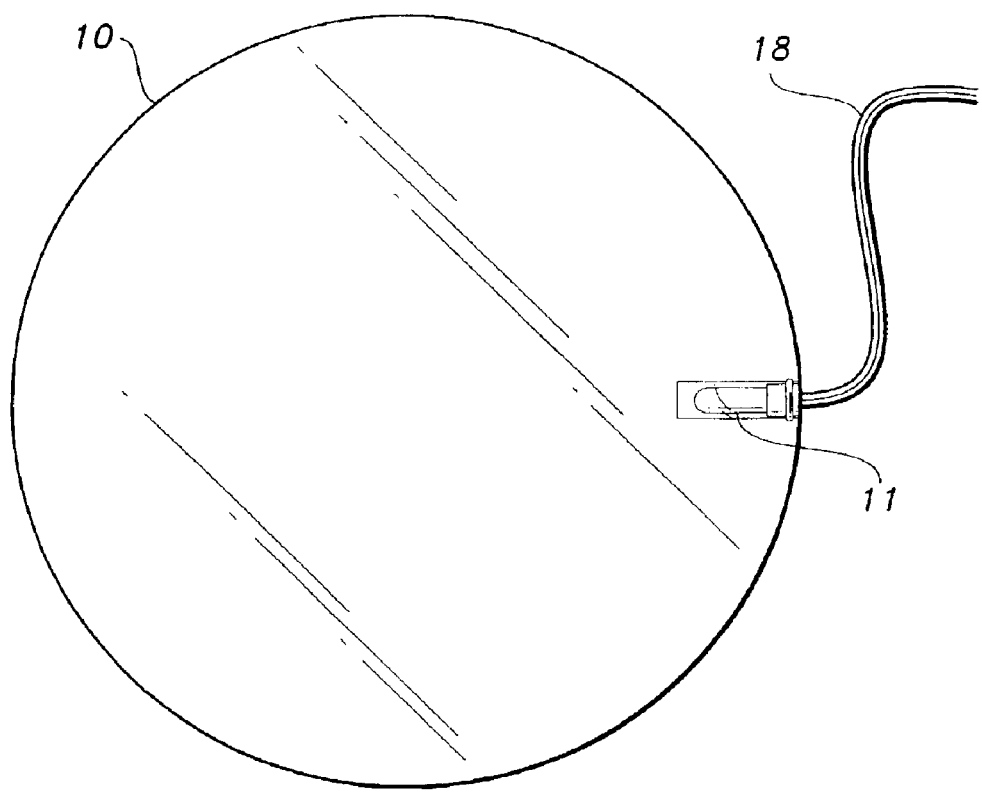
FIG. 3 is a top view of an illumination disk according to the present invention.

As best illustrated in FIGS. 2 and 3, disk 10 is fabricated from clear acrylic material. The disk has a diameter of approximately 2.75 inches and is 3/16 inches thick. These dimensions allow the disk to be readily accommodated in conventional recessed cup holders. An LED lamp 11 is positioned in a cavity in the disk and is sealed therein with hot melt glue thereby making the disk impervious to liquids. Wire 18 extends from the lamp to the electrical system of the vehicle or boat as explained above. Switch 20 functions to provide electrical energy to the lamp when desired. It should be noted, however that the disk may be wired directly into the vehicle's lighting system so that the disk is lit when the vehicle's lights are turned on. The disk is provided in different colors to satisfy various aesthetic tastes.

It is to be understood that the present invention is not limited to the embodiment described above, but encompasses any and all embodiments within the scope of the following claims.

I claim:

1. The combination of a motorized vehicle having a console, wherein the console has at least one recessed cup holder therein, said recessed cup holder having a bottom wall and an open top and an illumination device positioned in said cup holder on said bottom wall, said illumination device comprising:

a disk, said disk having a diameter of 2.75 inches and a thickness of 3/16 of an inch and being fabricated from a clear, transparent acrylic material;

an LED lamp enclosed within said disk and sealed therein; and electric transmission wires connected to said LED lamp.

2. The combination as recited in claim 1, wherein the motor vehicle has an electrical system and the electric transmission wires are connected to the electrical system for activating said LED lamp.

3. The combination as recited in claim 2, including a switch disposed on said console for activating and deactivating said LED lamp.

* * * * *